(12) United States Patent
Chen et al.

(10) Patent No.: US 9,784,626 B2
(45) Date of Patent: Oct. 10, 2017

(54) PRESSURE ARRAY SENSOR MODULE AND MANUFACTURING METHOD THEREOF

(71) Applicant: INDUSTRIAL TECHNOLOGY RESEARCH INSTITUTE, Hsinchu (TW)

(72) Inventors: Chang-Yi Chen, Hsinchu (TW); Jui-Yiao Su, New Taipei (TW); Yan-Chen Liu, Taipei (TW); Chang-Ho Liou, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 359 days.

(21) Appl. No.: 14/573,725

(22) Filed: Dec. 17, 2014

(65) Prior Publication Data
US 2016/0097688 A1    Apr. 7, 2016

(30) Foreign Application Priority Data
Oct. 3, 2014 (TW) .............................. 103134541 A

(51) Int. Cl.
    G01L 1/00     (2006.01)
    G01L 17/00    (2006.01)
(52) U.S. Cl.
    CPC ............ G01L 1/005 (2013.01); G01L 17/005 (2013.01)
(58) Field of Classification Search
    CPC ....... G01L 1/2287; G01L 5/228; G01L 1/205; G01L 19/003; G01L 1/18; G01L 1/24;
    (Continued)

(56) References Cited

U.S. PATENT DOCUMENTS

| 4,640,137 A | 2/1987 | Trull et al. |
| 5,010,774 A | 4/1991 | Kikuo et al. |

(Continued)

FOREIGN PATENT DOCUMENTS

| CN | 101263373 A | 9/2008 |
| EP | 1947436 A1 | 7/2008 |

(Continued)

OTHER PUBLICATIONS

Office action dated Dec. 1, 2015 issued in JP patent application No. 2014-248049 with English language translation (11 pgs.)

(Continued)

*Primary Examiner* — Lisa Caputo
*Assistant Examiner* — Brandi Hopkins
(74) *Attorney, Agent, or Firm* — Muncy, Geissler, Olds & Lowe, P.C.

(57) ABSTRACT

A pressure array sensor module, comprising an array electrode board, a plurality of pressure sensing elements, at least one first conductive structure and at least one second conductive structure is provided. The array electrode board comprises a substrate and an electrode array disposed on the substrate and having a first electrode pattern and a second electrode pattern. Each pressure sensing element is disposed at a sensing position on the array electrode board, and comprises a top electrode layer, a bottom electrode layer and at least one pressure sensing layer disposed between the top electrode layer and the bottom electrode layer. The top electrode layer has a first lead. The bottom electrode layer has a second lead. The first conductive structure electrically connects the first lead and the corresponding first electrode pattern. The second conductive structure electrically connects the second lead and the corresponding second electrode pattern.

20 Claims, 5 Drawing Sheets

(58) Field of Classification Search
CPC ............ A61B 2562/0247; A61B 5/447; A61B 2562/12; H03K 17/9622; H03K 17/962; G06F 3/0412; G06F 3/044; G06F 2203/04103; Y10T 29/49105; G01M 9/06
USPC ............. 73/862.046, 862.627, 727, 862.045, 73/862.041, 862.68
See application file for complete search history.

(56) References Cited

U.S. PATENT DOCUMENTS

| | | | |
|---|---|---|---|
| 5,799,533 | A | 9/1998 | Seki et al. |
| 6,964,205 | B2 | 11/2005 | Papakostas et al. |
| 7,258,026 | B2 | 8/2007 | Papakostas et al. |
| 7,926,366 | B2 | 4/2011 | Yang et al. |
| 7,973,274 | B2 | 7/2011 | Kuniyoshi et al. |
| 2001/0047246 | A1 | 11/2001 | Fullen et al. |
| 2010/0050784 | A1* | 3/2010 | Joung ............... G01L 5/228 73/862.046 |
| 2014/0130593 | A1 | 5/2014 | Ciou et al. |
| 2016/0097688 | A1 | 4/2016 | Chen et al. |

FOREIGN PATENT DOCUMENTS

| | | |
|---|---|---|
| JP | 57-198839 A | 12/1982 |
| JP | 58-79126 A | 5/1983 |
| JP | 64-61626 A | 3/1989 |
| JP | 3-245027 A | 10/1991 |
| JP | 2569433 B1 | 1/1997 |
| JP | 9-236504 A | 9/1997 |
| JP | 2003-344185 A | 12/2003 |
| JP | 4868347 B2 | 2/2012 |
| JP | 2013-178241 A | 9/2013 |
| JP | 2013178241 A * | 9/2013 |
| TW | 200921074 A | 5/2009 |
| TW | 201015055 A | 4/2010 |
| TW | I385366 B | 2/2013 |
| TW | 201310011 | 3/2013 |

OTHER PUBLICATIONS

Kim, Kunnyun, et al., Polymer-based flexible tactile sensor up to 32×32 arrays integrated with interconnection terminals, *Sensors and Actuators A*, 156 (2009), pp. 284-291.

Ashruf, C.M.A., Thin flexible pressure sensors, *Sensor Review*, vol. 22, Issue 4, (2002), pp. 322-327.

Papakostas, T.V., et al., 5.3: A Large Area Force Sensor for Smart Skin Applications, *Proc 1st IEEE Sensors Conf*, 2002, pp. 1620-1624.

Shimojo, Makoto, et al., A Tactile Sensor Sheet Using Pressure Conductive Rubber With Electrical-Wires Stitched Method, *IEEE Sensors Journal*, vol. 4, No. 5, Oct. 2004, pp. 589-596.

Hwang, Eun-Soo, et al., A Polymer-Based Flexible Tactile Sensor, for Normal and Shear Load Detection, *MEMS 2006*, Istanbul, Turkey, Jan. 22-26, 2006, pp. 714-717.

Mukai, Toshiharu, et al., Development of the Tactile Sensor System of a Human-Interactive Robot "RI-MAN", *IEEE Transactions on Robotics*, vol. 24, No. 2, Apr. 2008, pp. 505-512.

Lee, Hyung-Kew. et al., A Flexible Polymer Tactile Sensor: Fabrication and Modular Expandability for Large Area Deployment, *Journal of Microerectromechanical Systems*, vol. 15, No. 6, Dec. 2006, pp. 1681-1686.

\* cited by examiner

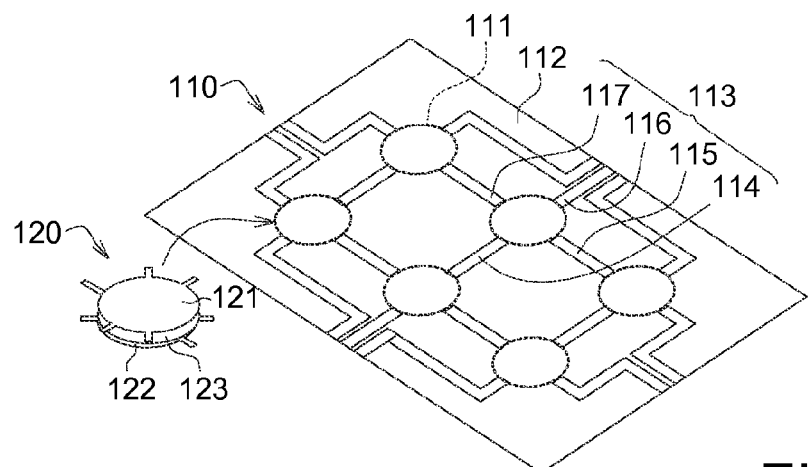
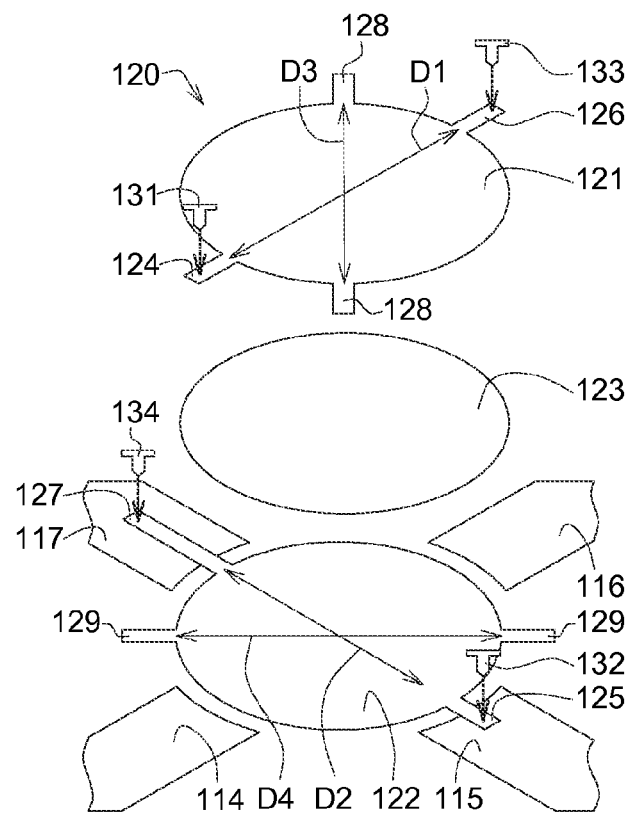
FIG. 1A
FIG. 1B

PRESSURE ARRAY SENSOR MODULE AND MANUFACTURING METHOD THEREOF

This application claims the benefit of Taiwan application Serial No. 103134541, filed Oct. 3, 2014, the disclosure of which is incorporated by reference herein in its entirety.

TECHNICAL FIELD

The disclosure relates in general to a sensing module, and more particularly a pressure array sensor module and a manufacturing method thereof.

BACKGROUND

Pressure sensor is mainly used for detecting the pressure which causes an element to deform. Pressure array sensing technology can be used for identifying the distribution of pressure and the change in geometric gradient when an element is pressed. For example, the pressure array sensing technology can be used in a shoe pad for detecting the distribution of pressure of the foot or used in a mattress for detecting the distribution of pressure and the locus of center of gravity during one's sleep.

The screen printing process adopted by the commonly seen thin-type pressure array sensor module is mostly composed of three procedures. Firstly, the pattern of electrode array is designed according to the needs of application, and the stencils for an electrode layer, a pressure sensing layer and an adhesion layer are manufactured. Next, the electrode layer, the pressure sensing layer and the adhesion layer are printed on a substrate by three times of screen printing process. Then, the above elements are aligned and assembled to form a pressure array sensor module. However, when the density of the sensing elements needs to be customized or adjusted, all stencils need to be re-designed, and the three procedures of the screen printing process need to be performed again. Each time of design change incurs a considerable amount of time and cost. Under such circumstance, it is extremely difficult to cut down manufacturing time and cost.

SUMMARY

The disclosure is directed to a pressure array sensor module and a manufacturing method thereof for resolving the problems encountered in the prior art.

According to one embodiment of the disclosure, a pressure array sensor module, comprising an array electrode board, a plurality of pressure sensing elements, at least one first conductive structure and at least one second conductive structure is provided. The array electrode board comprises a substrate and an electrode array disposed on the substrate and having a first electrode pattern and a second electrode pattern. Each pressure sensing element is disposed at a sensing position on the array electrode board, and comprises a top electrode layer, a bottom electrode layer and at least one pressure sensing layer disposed between the top electrode layer and the bottom electrode layer. The top electrode layer has a first lead. The bottom electrode layer has a second lead. The first conductive structure electrically connects the first lead and the corresponding first electrode pattern. The second conductive structure electrically connects the second lead and the corresponding second electrode pattern.

According to another embodiment of the disclosure, a manufacturing method of a pressure array sensor module is provided. The manufacturing method comprises following steps. An electrode array is formed on a substrate, wherein the electrode array has a first electrode pattern and a second electrode pattern. A plurality of pressure sensing elements are disposed on the substrate, each pressure sensing element has a top electrode layer, a bottom electrode layer and at least one pressure sensing layer disposed between the top electrode and the bottom electrode. Each lead of the top electrode layer and the corresponding first electrode pattern are electrically connected by at least one first conductive structure. Each lead of the bottom electrode layer and the corresponding second electrode pattern are electrically connected by at least one second conductive structure.

The above and other aspects of the disclosure will become better understood with regard to the following detailed description of the preferred but non-limiting embodiment(s). The following description is made with reference to the accompanying drawings.

BRIEF DESCRIPTION OF THE DRAWINGS

FIG. 1A is a schematic diagram of a pressure array sensor module according to an embodiment.

FIG. 1B is a structural decomposition diagram of a pressure sensing element.

Figure 2A:
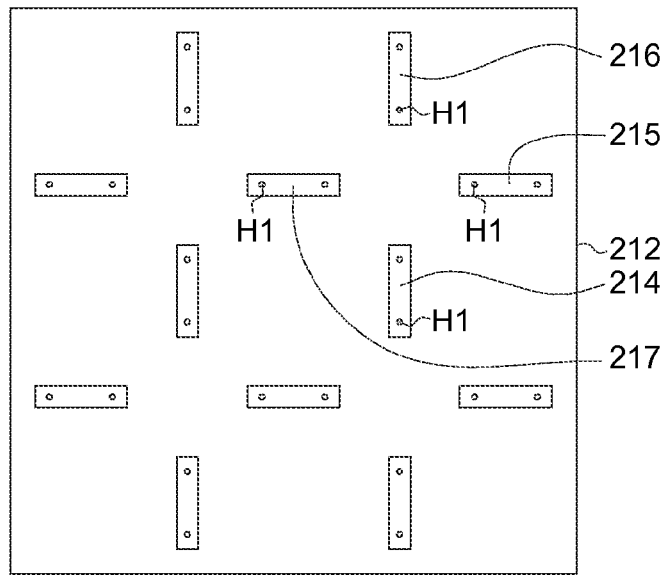
FIG. 2A is a schematic diagram of an array electrode board according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of embodiments are disclosed below with accompanying drawings for elaborating the disclosure. However, the embodiments are for exemplary and explanatory descriptions only, not for limiting the scope of protection of the disclosure.

First Embodiment

Refer to FIGS. 1A and 1B. FIG. 1A is a schematic diagram of a pressure array sensor module 100 according to an embodiment. FIG. 1B is a structural decomposition diagram of a pressure sensing element 120.

In an embodiment, the pressure array sensor module 100 comprises an array electrode board 110, a plurality of pressure sensing elements 120 (only one is illustrated), a first conductive structure 131 and a second conductive structure 132. Each pressure sensing element 120 is electrically connected to the array electrode board 110 through the first conductive structure 131 and the second conductive structure 132.

As indicated in FIG. 1A, the array electrode board 110 comprises a substrate 112 and an electrode array 113 disposed on a side or two opposite sides of the substrate 112. The electrodes of the electrode array are printed on the substrate 112 by, for example, a screen printing process. The electrode array 113 has several electrode patterns 114~117 whose circuit layout design can be adjusted to meet customers' requirements. The substrate 112 can be realized by a flexible insulating film or a printed circuit board, and the electrode array 113 is disposed around each sensing position 111.

In an embodiment, when the electrode array 113 is disposed on two opposite sides of the substrate 112, the sensing position 111 on each side can be changed according to the position of the electrode array 113, such that the sensing positions 111 on two opposite sides are interlaced. Thus, more pressure sensing elements 120 can be disposed on the array electrode board 110 to increase sensing density. That is, the number of elements per unit area is increased.

As indicated in FIG. 1A, each pressure sensing element 120 is disposed at a sensing position 111 on the array electrode board 110 (for example, the array electrode board 110 has 6 sensing positions 111 in total). The sensing positions are defined by the electrode patterns. The pressure sensing elements 120 are independent elements, and can be disposed at the sensing positions 111 defined by electrode patterns after the pressure sensing elements 120 have been formed independently. When the design of the electrode patterns is changed according to customers' requirements, the position or density distribution of each pressure sensing element 120 can be easily adjusted according to customers' requirements without having to manufacture stencil or perform screen printing process on the sensing elements again, so that manufacturing time and cost can be reduced.

As indicated in FIG. 1A, the electrode array 113 comprises a first electrode pattern 114, a second electrode pattern 115, a third electrode pattern 116 and a fourth electrode pattern 117. The first electrode pattern 114 is extended between two sensing positions 111 as a circuit for conducting two pressure sensing elements 120 disposed at corresponding positions. Besides, the second electrode pattern 115 is extended between two sensing positions 111 as a circuit for conducting two pressure sensing elements 120 disposed at corresponding positions. The extending direction of the first electrode pattern 114 is, for example, orthogonal, non-orthogonal or parallel to that of the second electrode pattern 115. FIG. 1A only illustrates the exemplification that the extending direction of the first electrode pattern 114 is orthogonal to that of the second electrode pattern 115. However, the disclosure does not restrict the relationship between the first electrode pattern 114 and the second electrode pattern 115.

As indicated in FIG. 1A, the extending direction of the first electrode pattern 114 is parallel to that of the third electrode pattern 116, and the extending direction of the second electrode pattern 115 is parallel to that of the fourth electrode pattern 117. In another embodiment, the extending direction of the first electrode pattern 114 is not parallel to that of the third electrode pattern 116. As indicated in FIG. 1B, the extending direction of the first electrode pattern 114 is parallel to the first direction D1. However, when the extending direction of the third electrode pattern 116 changes to be parallel to the third direction D3 from a direction parallel to the first direction D1, the first electrode pattern 114 and the third electrode pattern 116 are not on the same extending direction. As indicated in FIG. 1B, the extending direction of the second electrode pattern 115 is parallel to the second direction D2. However, when the extending direction of the fourth electrode pattern 117 changes to be parallel to the fourth direction D4 from a direction parallel to the second direction D2, the second electrode pattern 115 and the fourth electrode pattern 117 are not on the same extending direction. The above exemplifications show that the orientation of the said electrode patterns 114~117 can be adjusted.

Refer to FIG. 1B. Each pressure sensing element 120 comprises a top electrode layer 121, a bottom electrode layer 122 and at least one pressure sensing layer 123. The top electrode layer 121 has a first lead 124 corresponding to the first electrode pattern 114 so that the first lead 124 and the first electrode pattern 114 overlap with each other in a vertical direction (a normal direction of the substrate 112). In addition, the bottom electrode layer 122 has a second lead 125 corresponding to the second electrode pattern 115 such that the second lead 125 and the second electrode pattern 115 overlap with each other in a vertical direction (a normal direction of the substrate 112). The pressure sensing layer 123 is disposed between the top electrode layer 121 and the bottom electrode layer 122, such that the top electrode layer 121, the pressure sensing layer 123 and the bottom electrode layer 122 overlap with each other in a vertical direction (a normal direction of the substrate 112).

As indicated in FIG. 1B, the first lead 124 of each pressure sensing element 120 and the first electrode pattern 114 are electrically connected through the first conductive structure 131, and the second lead 125 and the second electrode pattern 115 are electrically connected through the second conductive structure 132. Therefore, two adjacent pressure sensing elements 120 can be electrically and serially connected together through the first electrode pattern 114 and two first conductive structures 131 located at two ends of the first electrode pattern 114 to meet the requirement of modularization. Similarly, two adjacent pressure sensing elements 120 can be electrically and serially connected together through the second electrode pattern 115 and two second conductive structure 132 located at two ends of the second electrode pattern 115 to meet the requirement of modularization.

As indicated in FIG. 1B, the top electrode layer 121 has a third lead 126 corresponding to the third electrode pattern 116 such that the third lead 126 and the third electrode pattern 116 overlap with each other in a vertical direction (a normal direction of the substrate 112). Similarly, the bottom electrode layer 122 has a fourth lead 127 corresponding to the fourth electrode pattern 117 such that the fourth lead 127 and the fourth electrode pattern 117 overlap with each other in a vertical direction (a normal direction of the substrate 112).

As indicated in FIG. 1B, the third lead 126 of each pressure sensing element 120 and the third electrode pattern 116 are electrically connected through the third conductive structure 133, and the fourth lead 127 and the fourth electrode pattern 117 are electrically connected through the fourth conductive structure 134. Thus, the top electrode layer 121 of each pressure sensing element 120 is serially connected between the first electrode pattern 114 and the third electrode pattern 116 through the first conductive structure 131 and the third conductive structure 133 to meet the requirement of modularization. Similarly, the bottom electrode layer 122 of each pressure sensing element 120 is serially connected between the first electrode pattern 114 and the third electrode pattern 116 through the second conductive structure 132 and the fourth conductive structure 134 to meet the requirement of modularization.

As indicated in FIG. 1B, the top electrode layer 121 can use other leads 128 to replace the first lead 124 and/or the third lead 126 to electrically connect the first electrode pattern 114 and/or the third electrode pattern 116 located in different orientations. That is, when the orientation of the first electrode pattern 114 and/or the third electrode pattern 116 changes, the first electrode pattern 114 and/or the third electrode pattern 116 can be connected through the corresponding leads 128 (in pair or only one). Therefore, there is no need to manufacture additional pressure sensing elements 120, and manufacturing cost can thus be reduced. In another embodiment, the first lead 124 and the third lead 126 can be used together or alternately with the other two leads 128; or, only one, two or three of the above four leads are used, and the disclosure does not have specific restrictions.

Likewise, as indicated in FIG. 1B, the bottom electrode layer 122 can use other leads 129 to replace the second lead 125 and/or the fourth lead 127 to electrically connect the second electrode pattern 115 and/or the fourth electrode pattern 117 located in different orientations. That is, when the orientation of the second electrode pattern 115 and/or the fourth electrode pattern 117 changes, the second electrode pattern 115 and/or the fourth electrode pattern 117 can be connected through the corresponding lead 129 (in pair or only one). Therefore, there is no need to manufacture additional pressure sensing elements 120, and manufacturing cost can thus be reduced. In another embodiment, the second lead 125 and the fourth lead 127 can be used together or alternately with the other two leads 129; or, only one, two or three of the above four leads are used, and the disclosure does not have specific restrictions.

Second Embodiment

Figure 2B:
FIG. 2B is a structural decomposition diagram of a pressure sensing element.
Figure 2B:
Figure 2B:
Figure 2B:
Figure 2B:
Figure 2B:
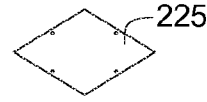
Figure 2C:
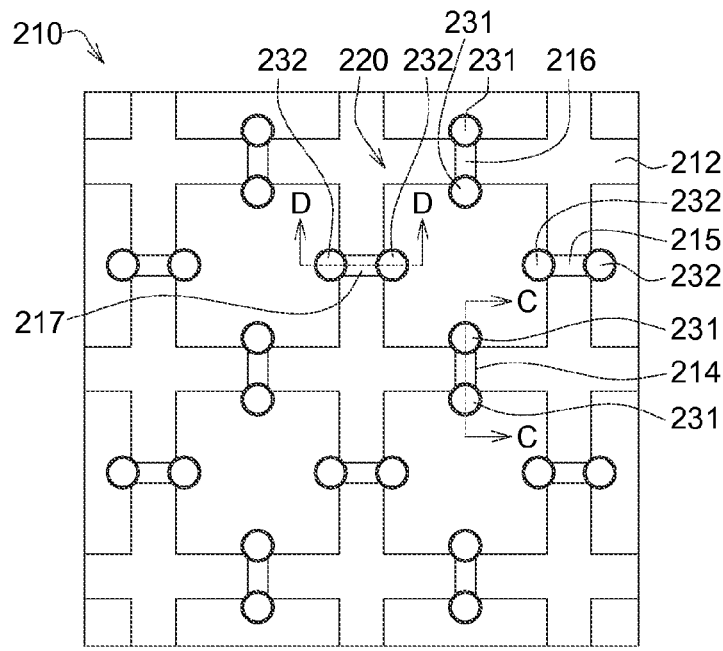
FIG. 2C is a schematic diagram of a plurality of pressure sensing elements disposed on the array electrode board.

Refer to FIGS. 2A-2C. FIG. 2A is a schematic diagram of an array electrode board 210 according to an embodiment. FIG. 2B is a structural decomposition diagram of a pressure sensing element 220. FIG. 2C is a schematic diagram of a plurality of pressure sensing elements 220 disposed on the array electrode board 210. As indicated in FIG. 2B, each pressure sensing element 220 comprises a top substrate 224, a top electrode layer 221, at least one pressure sensing layer 223, a bottom electrode layer 222, a bottom substrate 225 and a plurality of connecting portions 228. The connecting portions 228, interspaced by intervals and arranged in a circular shape, connect the top substrate 224 and the bottom substrate 225, such that the top electrode layer 221, the pressure sensing layer 223 and the bottom electrode layer 222 are stacked between the top substrate 224 and the bottom substrate 225. Moreover, each of the leads 226 and 227 of the top electrode layer 221 and the bottom electrode layer 222 passes through the gap between two adjacent connecting portions 228 as indicated in FIG. 3.

Figure 3:
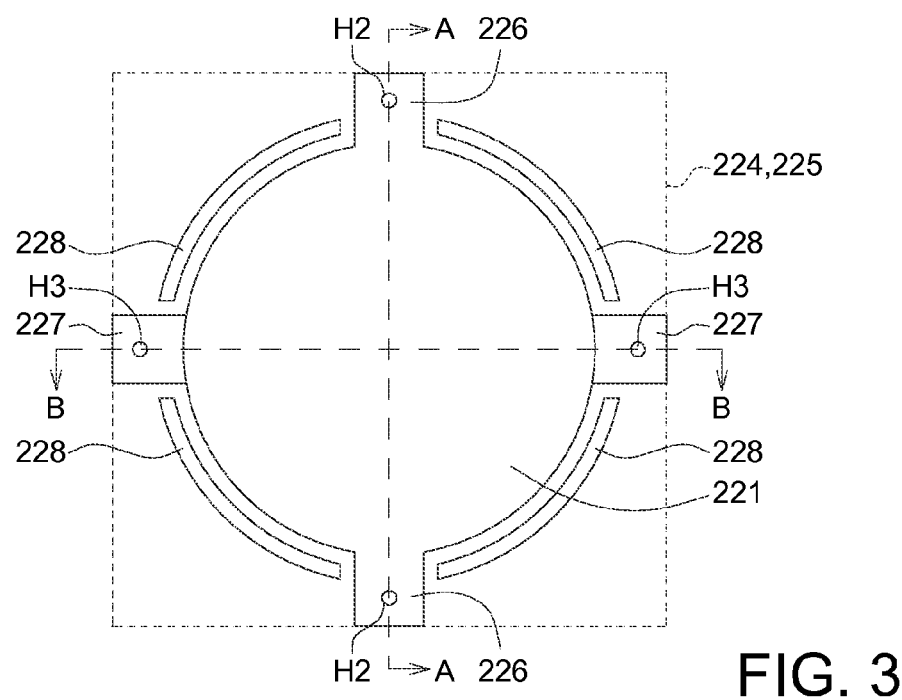
FIG. 3 is a top view of the pressure sensing element of FIG. 2B after assembly.
Figure 4A:
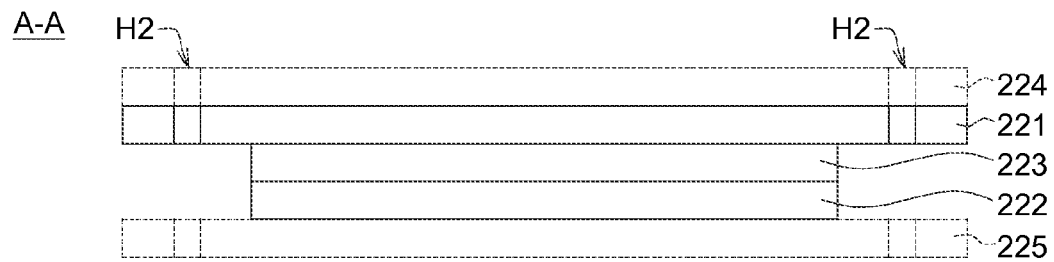
FIG. 4A is a cross-sectional view along cross-sectional line A-A of FIG. 3.
Figure 4B:
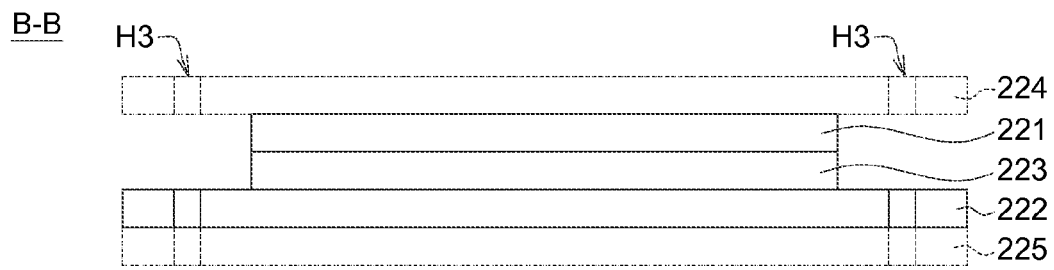
FIG. 4B is a cross-sectional view along cross-sectional line B-B of FIG. 3.

Refer to FIG. 3 and FIGS. 4A and 4B. FIG. 3 is a top view of the pressure sensing element 220 of FIG. 2B after assembly. FIG. 4A is a cross-sectional view along cross-sectional line A-A of FIG. 3. FIG. 4B is a cross-sectional view along cross-sectional line B-B of FIG. 3. The top substrate 224 and the bottom substrate 225 are denoted by dotted lines such that the structural relationship between components can be more clearly illustrated.

As indicated in FIG. 2A, several first through holes H1 formed on the array electrode board 210 penetrate the electrode patterns 214~217 and the substrate 212 at the same time. As indicated in FIGS. 2B, 3 and 4A-4B, several second through holes H2 and several third through holes H3 are formed on the pressure sensing element 220, wherein the second through holes H2 penetrate the top substrate 224, the top electrode layer 221 and the bottom substrate 225, and the third through holes H3 penetrate the top substrate 224, the bottom electrode layer 222 and the bottom substrate 225. The positions of the second through holes H2 and the third through holes H3 correspond to the positions of the first through holes H1 on the array electrode board 210.

As indicated in FIG. 3, the second through holes H2 correspondingly penetrate the leads 226 of the top electrode layer 221, and the third through holes H3 correspondingly penetrate the leads 227 of the bottom electrode layer 222. The leads 226 of the top electrode layer 221 can be realized by the first lead 124 and the third lead 126 or the other two leads 128. The leads 227 of the bottom electrode layer 222 can be realized by the second lead 125 and the fourth lead 127 or the other two leads 129.

Figure 5A:
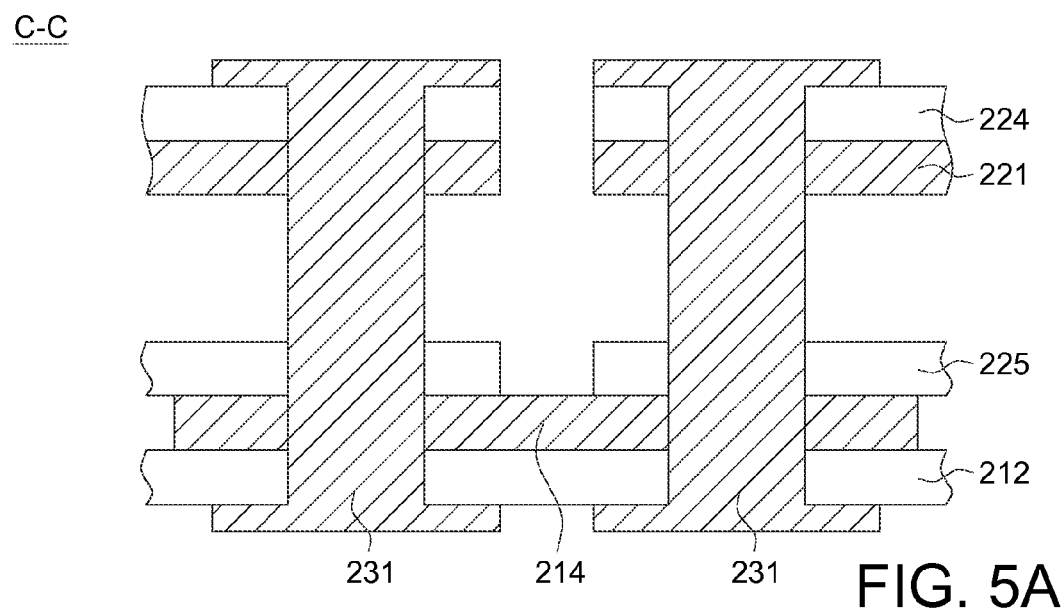
FIG. 5A is a cross-sectional view along cross-sectional line C-C of FIG. 2C.

Referring to FIG. 5A, a cross-sectional view along cross-sectional line C-C of FIG. 2C is shown. As indicated in FIG. 2C, several vertical conductive elements 231 penetrate the second through holes H2 of the pressure sensing elements 220 (FIG. 4A) and the first through holes H1 of the corresponding array electrode board 210 (FIG. 2A) to form a pressure array sensor module 200. As indicated in FIG. 5A, each vertical conductive element 231 sequentially penetrates the top substrate 224, the top electrode layer 221, the bottom substrate 225, the electrode pattern 214 and the substrate 212 in a top down manner, such that the top electrode layer 221 and the electrode pattern 214 are vertically conducted. Therefore, two adjacent pressure sensing elements 220 are electrically and serially connected through the electrode pattern 214 and two vertical conductive elements 231 located at two ends of the electrode pattern 214 to meet the requirement of modularization. The same processing can be used in the electrode pattern 216, and the similarities are not repeated here.

The electrode pattern 214 can be realized by the above first electrode pattern 114 or the above third electrode pattern 116, and each vertical conductive element 231 can be realized by the above first conductive structure 131 or the above third conductive structure 133.

Figure 5B:
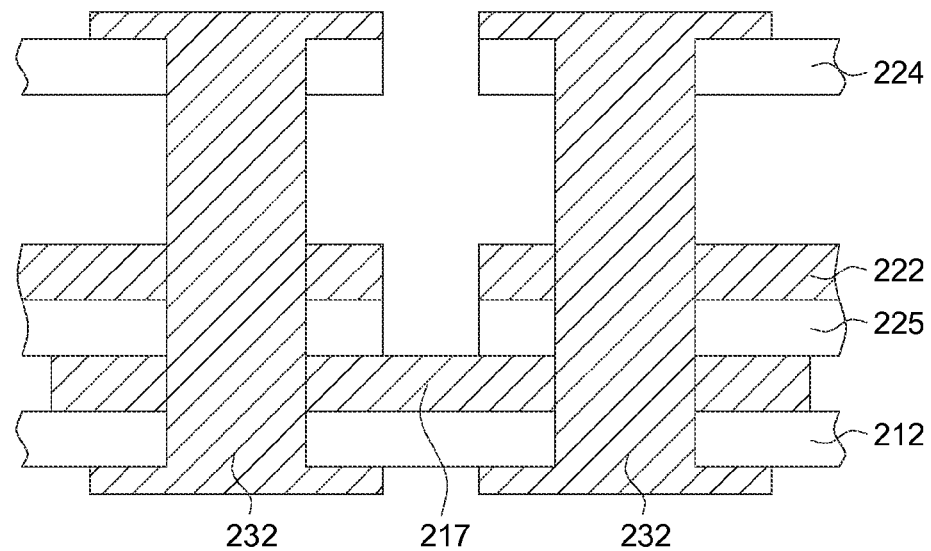
FIG. 5B is a cross-sectional view along cross-sectional line D-D of FIG. 2C.

Referring to FIG. 5B, a cross-sectional view along cross-sectional line D-D of FIG. 2C is shown. As indicated in FIG. 2C, several vertical conductive elements 232 penetrate the third through holes H3 of the pressure sensing elements 220 (FIG. 4B) and the first through holes H1 of the corresponding array electrode board 210 (FIG. 2A) to form a pressure array sensor module 200. As indicated in FIG. 5B, each vertical conductive element 232 sequentially penetrates the top substrate 224, the bottom electrode layer 222, the bottom substrate 225, the electrode pattern 217 and the substrate 212 in a top down manner, such that the bottom electrode layer 222 and electrode pattern 217 are vertically conducted. Therefore, two adjacent pressure sensing elements 220 are electrically and serially connected through the electrode pattern 217 and two vertical conductive elements 232 located at two ends of the electrode pattern 217 to meet the requirement of modularization. The same processing can be used in the electrode pattern 215, and the similarities are not repeated here.

Figure 5C:
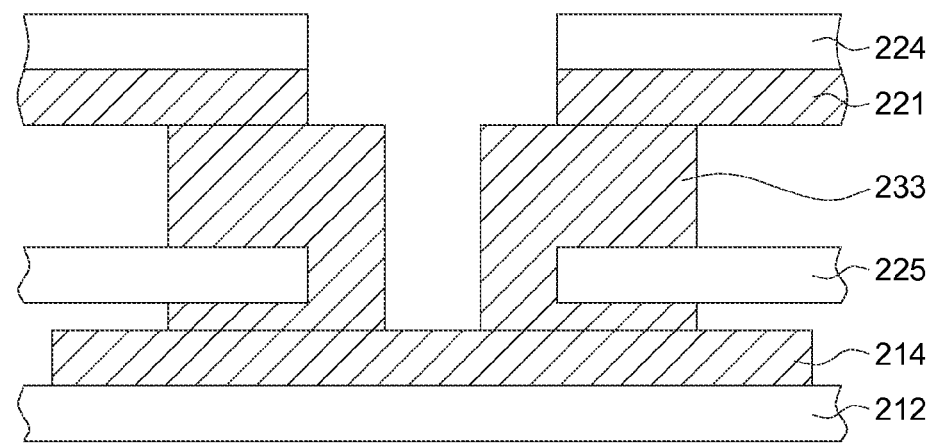
FIG. 5C is a cross-sectional view of a conductive structure according to another embodiment.

The electrode pattern 217 can be realized by the above second electrode pattern 115 or the above fourth electrode pattern 117, and each vertical conductive element 232 can be realized by the above second conductive structure 132 or the above fourth conductive structure 134. The vertical conductive elements 231 and 232 can be formed from a metal, an alloy, a solder paste or an anisotropic conductive material. If the vertical conductive elements 231 and 232 are formed from a conductive glue or a solder paste, the conductive glue or the solder paste penetrates the through hole and is then solidified into a columnar body, such that the pressure sensing elements 220 and the array electrode board 210 can be integrated into one piece Referring to FIG. 5C, a cross-sectional view of a conductive structure 233 according to another embodiment is shown. The conductive structure 233 can be formed from a conductive material such as a solder paste or a conductive glue, or a conductive plate and can be used as a medium of electrical transmission between the electrode pattern 214 and the top electrode layer 221 or between the electrode pattern 217 and the bottom electrode layer 222. The conductive structure 233 can be realized by the above first conductive structure 131, the above second conductive structure 132, the above third conductive structure 133 or the above fourth conductive structure 134.

In an embodiment that is not illustrated, when the conductive structure 233 is a conductive plate, the lead of the pressure sensing element can be extended to the electrode pattern at the peripheral of the substrate 212, and the conductive plate can clamp or fix the lead and the corresponding electrode pattern to achieve electrical connection.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A pressure array sensor array module, comprising:
    an array electrode board, comprising:
        a substrate; and
        an electrode array disposed on the substrate and having a first electrode pattern and a second electrode pattern;
    a plurality of pressure sensing elements each being disposed at a sensing position on the array electrode board, being a separable independent element, and comprising:
        a top electrode layer having a first lead;
        a bottom electrode layer having a second lead;
        a plurality of connecting portions interspaced by a plurality of gaps and arranged in a circular shape, wherein the first lead of the top electrode layer and the second lead of the bottom electrode layer pass through the gaps between the plurality of the connecting portions; and
        at least one pressure sensing layer disposed between the top electrode layer and the bottom electrode layer;
    a plurality of first conductive structures each electrically connecting the first lead and the corresponding first electrode pattern; and
    a plurality of second conductive structures each electrically connecting the second lead and the corresponding second electrode pattern.

2. The pressure sensor array module according to claim 1, wherein the first electrode pattern is extended between two of the plurality of adjacent pressure sensing elements, and the two of the plurality of the adjacent pressure sensing elements are electrically connected through the first electrode pattern and two corresponding first conductive structures.

3. The pressure sensor array module according to claim 1, wherein the second electrode pattern is extended between two of the plurality of adjacent pressure sensing elements, and the two of the plurality of the adjacent pressure sensing elements are electrically connected through the second electrode pattern and two corresponding second conductive structures.

4. The pressure sensor array module according to claim 1, further comprising:
    a plurality of third conductive structures, and
    a plurality of fourth conductive structures; wherein
        the electrode array further comprises a third electrode pattern and a fourth electrode pattern disposed on the substrate, wherein each top electrode layer further has a third lead, and each bottom electrode layer further has a fourth lead,
        each third conductive structure electrically connects the third lead and the corresponding third electrode pattern, and
        each fourth conductive structure electrically connects the fourth lead and the corresponding fourth electrode pattern.

5. The pressure sensor array module according to claim 4, wherein the third electrode pattern is extended between two of the plurality of adjacent pressure sensing elements, and the two of the plurality of the adjacent pressure sensing elements are electrically connected through the third electrode pattern and two corresponding third conductive structures.

6. The pressure sensor array module according to claim 4, wherein the fourth electrode pattern is extended between two of the plurality of adjacent pressure sensing elements, and the two of the plurality of the adjacent pressure sensing elements are electrically connected through the fourth electrode pattern and two corresponding fourth conductive structures.

7. The pressure sensor array module according to claim 4, wherein the top electrode layer of each pressure sensing element is serially connected between the first electrode pattern and the third electrode pattern through the first conductive structures and the third conductive structures.

8. The pressure sensor array module according to claim 4, wherein the bottom electrode layer of each pressure sensing element is serially connected between the second electrode pattern and the fourth electrode pattern through the second conductive structures and the fourth conductive structures.

9. The pressure sensor array module according to claim 1, wherein each pressure sensing element further comprises a top substrate and a bottom substrate, wherein the plurality of connecting portions connects the top substrate and the bottom substrate, and the top electrode layer, the pressure sensing layer and the bottom electrode layer are stacked between the top substrate and the bottom substrate.

10. The pressure sensor array module according to claim 1, wherein the first and the second conductive structures are vertical conductive elements penetrating each pressure sensing element and the array electrode board.

11. The pressure sensor array module according to claim 1, wherein the electrode array is disposed on a side or two opposite sides of the substrate.

12. A manufacturing method of pressure sensor array module, comprising:

forming an electrode array on a side or two opposite sides of a substrate, wherein the electrode array has a first electrode pattern and a second electrode pattern;

disposing a plurality of pressure sensing elements on the substrate, wherein each of the plurality of the pressure sensing elements is a separable independent element and comprises a top electrode layer, a bottom electrode layer, a plurality of connecting portions and at least one pressure sensing layer disposed between the top electrode and the bottom electrode, the top electrode layer has a first lead, the bottom electrode layer has a second lead, the plurality of connecting portions is interspaced by a plurality of gaps and arranged in a circular shape, the first lead of the top electrode layer and the second lead of the bottom electrode layer pass through the gaps between the plurality of the connecting portions;

electrically connecting the first lead and the corresponding first electrode pattern by a plurality of first conductive structures; and electrically connecting the second lead and the corresponding second electrode pattern by a plurality of second conductive structures.

13. The manufacturing method according to claim 12, wherein the first electrode pattern is extended between two of the plurality of adjacent pressure sensing elements, and the two of the plurality of the adjacent pressure sensing elements are electrically connected through the first electrode pattern and two corresponding first conductive structures.

14. The manufacturing method according to claim 12, wherein the second electrode pattern is extended between two of the plurality of adjacent pressure sensing elements, and the two of the plurality of the adjacent pressure sensing elements are electrically connected through the second electrode pattern and two corresponding second conductive structures.

15. The manufacturing method according to claim 12, wherein the electrode array further comprises a third electrode pattern and a fourth electrode pattern disposed on the substrate, each top electrode layer further has a third lead, each bottom electrode layer further has a fourth lead, and the manufacturing method of pressure sensor array module further comprises:

electrically connecting each third lead and the corresponding third electrode pattern by a plurality of third conductive structures; and electrically connecting each fourth lead and the corresponding fourth electrode pattern by a plurality of fourth conductive structures.

16. The manufacturing method according to claim 15, wherein the third electrode pattern is extended between two of the plurality of adjacent pressure sensing elements, and the two of the plurality of the adjacent pressure sensing elements are electrically connected through the third electrode pattern and two corresponding third conductive structures.

17. The manufacturing method according to claim 15, wherein the fourth electrode pattern is extended between two of the plurality of adjacent pressure sensing elements, and the two of the plurality of the adjacent pressure sensing elements are electrically connected through the fourth electrode pattern and two corresponding fourth conductive structures.

18. The manufacturing method according to claim 15, wherein the top electrode layer of each pressure sensing element is serially connected between the first electrode pattern and the third electrode pattern through the first conductive structures and the third conductive structures.

19. The manufacturing method according to claim 15, wherein the bottom electrode layer of each pressure sensing element is serially connected between the second electrode pattern and the fourth electrode pattern through the second conductive structures and the fourth conductive structures.

20. The manufacturing method according to claim 12, wherein the first and the second conductive structures are vertical conductive elements.

* * * * *